April 14, 1959  K. E. FAIVER  2,882,069
AIR SUSPENSION CONTROL SYSTEM
Filed Nov. 1, 1956
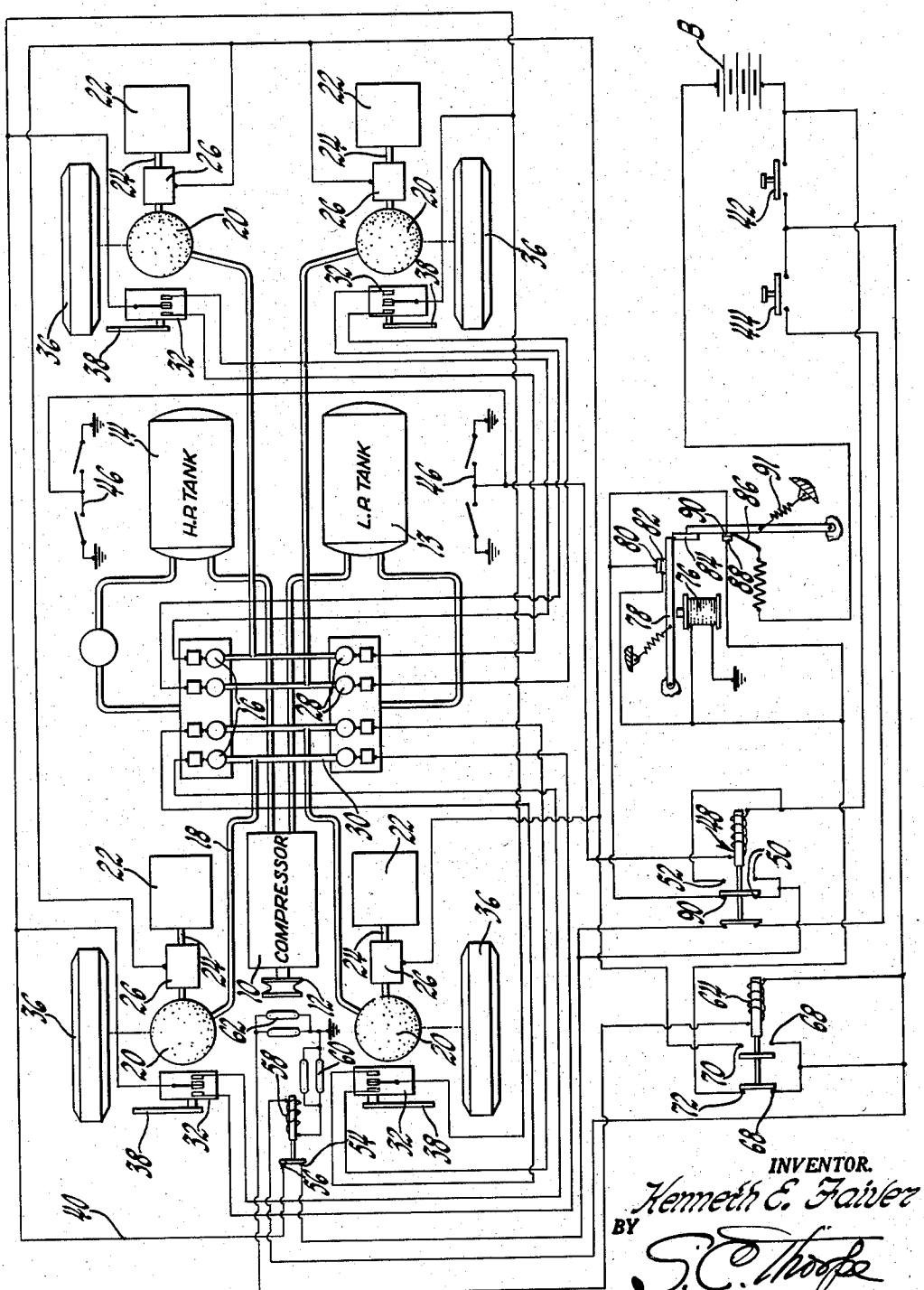
INVENTOR.
Kenneth E. Faiver
BY
S. C. Thorpe
ATTORNEY.

United States Patent Office 2,882,069
Patented Apr. 14, 1959

2,882,069

AIR SUSPENSION CONTROL SYSTEM

Kenneth E. Faiver, Lansing, Mich., assignor to General Motors Corporation, Detroit, Mich., a corporation of Delaware Application November 1, 1956, Serial No. 619,732

7 Claims. (Cl. 280—124)

This invention concerns control apparatus for a vehicle suspension system utilizing pneumatic springs in lieu of the conventionally employed metal springs.

Pneumatic springs afford a number of substantial advantages apart from the improved ride they provide. Thus, spring replacement is largely eliminated since there is no metal fatigue; and because of the absence of metal to metal contact lubrication is unnecessary. Incident to the improved riding qualities, body stresses are markedly reduced, road shocks being more completely absorbed with the transmission of fewer vibrations to the body.

Another advantage inherent in air suspension has relation to the ease and rapidity with which the spring height may be changed. With such a suspension, it is possible by charging or discharging air from the springs upon a change in load to maintain the vehicle body at a constant level with respect to the axles irrespective of load. This levelling of the vehicle body may be accomplished automatically using equipment presently available—see, for example Rossman Patent 2,670,201 of February 23, 1954.

The Rossman and the other related devices include a time delay mechanism serving to prevent their operation except when the vehicle is being loaded or unloaded, the purpose being to avoid changes in body height from axle deflections caused by ordinary road shocks. For the most part, such devices were developed for use on heavy vehicles, as trucks and buses, and they have been found to perform satisfactorily in this connection. In the case of passenger cars, however, it is deemed advisable to provide for levelling not only during loading and unloading but also with the vehicle in motion, since the load change may occur so rapidly (e.g. quick discharge of one or more passengers with an immediate re-start) as not to allow sufficient time for the proper height adjustment to take place.

Additional levellizing action after the car has gotten underway is further desirable to compensate for shifts in load, as when a heavy passenger behind the driver shifts from one side of the car to the other, and to make up for loss of weight due to fuel consumption and minor air leaks, which are prone to occur. Still another reason for providing for levellizing with the car in motion has relation to the situation where the levellizing action during the passenger loading or unloading occurred while the vehicle was standing on a road surface which was not horizontal. Here, in the absence of corrective means, the vehicle until the next stop tends to be disposed in a pitched attitude, adversely affecting the comfort of the passengers and the operation of the suspension.

As indicated, the present invention aims to provide a control system for an air suspension which allows for levellizing while the vehicle is in motion.

Another object is to provide such a system characterized in operation in that levellizing is prevented during inertia changes tending to cause angular displacements of the vehicle body relative to the running gear.

A further object is to provide a control system characterized in operation in that with the vehicle in motion air can be normally charged to or withdrawn from the pneumatic springs only occasionally, to the end of sparing the air compressor from an undue amount of work and to the end of reducing the current consumed by the control parts, where electrical.

A still further object is to provide a control system for the purpose described in which the levellizing with the vehicle stationary is brought into play by a vehicle condition normally obtaining only when the vehicle is stopped. This condition is desirably the opening of one of the doors of the vehicle.

Still another object is to provide a control system in the operation of which the levellizing with the vehicle in motion is brought into play for a predetermined short period as an incident of the cessation of a body displacement due to an inertia condition.

An additional and important object of the invention is to provide an air suspension control system which operates to change the spring rate or stiffness when desirable to reduce rolling of the vehicle body on turns and curves.

Other objects and features of the invention will become apparent from the subsequent description of a preferred embodiment thereof. The description will proceed with reference to the accompanying diagrammatic drawing.

Referring to the drawing, the numeral 10 denotes a compressor powered as by belt and pulley 12 from the crankshaft of the vehicle engine. The compressor draws from a low pressure tank 13 and outputs to a high pressure tank 14. The high pressure tank is connected to the common input side of four solenoid operated valves 16 each of which connects via a line 18 with one of the air springs 20. A reservoir chamber 22 connected to each spring 20 via a conduit 24 provides additional air space and makes possible the employment of a lower spring rate, giving a softer ride. Disposed in each conduit 24 is a normally open, electrically actuable valve 26, serving a purpose which will later appear.

For a general understanding of the type of air spring here contemplated reference is made to U.S. Patent 2,691,-420 to Fox et al.

In addition to the solenoid operated valves 16, the system comprises four more such valves 28 having a common connection with the low pressure tank 13 and individual connections with the air springs via lines 30 which open to lines 18. Thus, valves 16 operate to control air flow from the high pressure tank 14 to the springs, while the valves 28 control the air flow from the springs to the low pressure tank 13. Both sets of valves are normally closed.

Energization of the solenoid valves 16 and 28 is effected through switches 32 and the circuitry shown by the drawing. Each air spring is served by one of the switches, located near the spring and the corresponding road wheel 36. An actuating arm 38 associated with each switch is adapted for connection via a suitable linkage to an unsprung part of the vehicle, normally an axle component. The switch assembly itself is mounted on the frame or body of the vehicle.

The linkage, not here shown, through which the actuating arm 38 is connected to the unsprung member is made adjustable to permit some variation in the standing height of the vehicle body.

In operation of the levelling system, as a change in load occurs, arm 38 of each affected spring is rotated in one direction or the other to close the corresponding contact in the switch assembly, resulting in the admission or exhaustion of air from the spring as necessary to maintain the predetermined constant body height. It is here assumed that the vehicle is not in a longitudinally pitched attitude, in which event as later herein brought out, levellizing cannot occur, and that the common feed line 40 to the switches 32 is energized. This is the case if switches 42 and 44 are closed or if one of the switches 46 is closed. Switch 42 is closed by the turning of the vehicle ignition switch, while switch 44 is closed by the placing of the vehicle transmission in "neutral," or "park," assuming an automatic transmission. Each switch 46 is located at a door of the vehicle and becomes closed on the opening of the door. On reflection it will be recognized, considering the nature of the switches, that air can normally be charged to or withdrawn from the springs for levelling purposes only when the vehicle is stationary.

The energization of the common feed line 40 to the switches 32, as brought about by the closing of one of the door switches 46, proceeds with energization of a relay 48, causing closing of the normally open contacts 50, 52. Contact 50, it will be observed, has connection with one of two normally closed contacts 54, 56.

The latter contacts are under the control of a relay coil 58 in circuit with mercury switches 60. One of the mercury switches 60 is so disposed as to be responsive to braking reactions manifested by a tendency of the vehicle body to "dive," while the other is disposed to be responsive to reactions induced by acceleration and reflected by "squatting" of the vehicle body. Laterally disposed switches 62 are sensitive to body roll, each switch being effective as to one direction of rotation of the body about its longitudinal axis. In their normal position switches 62, like switches 60, are open so that a relay coil 64 controlled thereby is normally not energized.

To digress a moment, it is desirable, as previously noted, to provide for stabilization of the vehicle body on a turn or curve, and also to provide for some levellizing action with the vehicle in motion. This further levellizing should be occasional or intermittent in the interest of sparing the compressor from an undue amount of work. In accordance with the invention, the cessation of an inertia disturbance tending to cause rolling of the vehicle body (normally a disturbance resulting from the negotiation of a turn or curve) is utilized as the signal whereby levellizing, if in order, may occur for a short period of predetermined duration, provided the vehicle body is not in a longitudinally pitched attitude.

Let it be assumed that the vehicle as represented by the drawing is about to enter a turn from a straight course. As the vehicle body tends to roll in the turn, one of the mercury switches 62 closes, grounding relay coil 64, which effects closing of normally open contacts 68 and 70. Battery voltage is consequently applied to energize all four of the electrically actuable valves 26, bringing about closing of the corresponding conduits 24 with stiffening of the springs, since transfer of air from the springs to the air chambers can no longer occur. The stiffening of the springs naturally tends to prevent rolling of the vehicle body.

With the turn negotiated, the involved switch 62 returns to its open position and relay 64 becomes deenergized, a condition marked by closing of contacts 68 and 72 and re-energization of a normally energized relay coil 76. Upon the re-energization of such coil, the same tends to attract its armature 78 to open the contacts 80 and 82. However, it is momentarily prevented from doing this by the latch 84. The latter is under the control of a hot wire time delay device 86 which is energized through contacts 68 and 72 and contacts 88 and 90. As voltage continues to be applied to the hot wire, the same expands allowing spring 91 to move the latch 84 from holding armature 78, allowing for breaking of contacts 80 and 82 by the relay coil 76 and also opening of contacts 88 and 90, thereby allowing the hot wire delay device to cool. During the period of expansion of the hot wire, about eight seconds, for example, the common feed line 40 to all of the wheel switches 32 will be energized through contacts 50 and 90 and contacts 54 and 56 so that if any of the springs need air or need to have air exhausted therefrom the required action will take place. Thus, assuming that the right front spring 20 is in need of air, the leftmost solenoid valve 16 will be energized through the switch 32 associated with the right front spring and air will be charged to the spring to the extent required by the movement of the corresponding actuating arm 38—as limited by the eight second or other time period set by the hot wire device 86.

It is important to observe that the foregoing assumes that relay coil 58 is de-energized. This coil, as afore noted, is under the control of mercury switches 60 which are responsive, respectively, to acceleration and deceleration. Should either of these conditions occur, contacts 54 and 56 will be broken by the resultant energization of the relay coil 58 and the common feed line 40 will become de-energized, precluding charging of air to or discharging of air from the air springs. In this way, levelling is prevented when the vehicle body is in a pitched attitude along its longitudinal axis. Should levellizing be permitted to occur with the body of the vehicle so pitched, the pitched attitude would tend to hold at least until after the next turn, which would be obviously undesirable. Significantly, the overrule represented by the mercury switches 60 obtains even with the vehicle stationary.

Having thus described and illustrated my invention, what I claim is:

1. In an automotive vehicle having a plurality of road wheels or the equivalent and a pneumatic spring associated with each wheel, each said spring being connected to a corresponding air chamber, deflections thereof being marked by air transfer between the spring and the chamber, a regulating system for said springs comprising: a source of air pressure carried by the vehicle, an air passage between said source and each individual spring, a valve in each said passage, means responsive to vehicle motion for maintaining said valves in closed position, means sensitive to changes in the height of the sprung portion of the vehicle associated with each spring and operably connected to the corresponding valve, means controlled by said height-sensing means for exhausting air from said springs, a normally open valve in the connection between each said spring and its corresponding air chamber, inertia-sensitive means operably connected to said last valves for closing the same, with the vehicle in motion, when the sprung portion of the vehicle tends to become displaced due to an inertia condition said inertia-sensitive means is adapted to sense, and timing apparatus governed by said inertia-sensitive means to overrule said means responsive to vehicle motion and open said first recited valves whereby with the vehicle in motion such valves are opened for a predetermined period on cessation of the inertia disturbance to permit air flow through the corresponding passages, when called for by said height sensing means.

2. In an automotive vehicle having a plurality of road wheels or the equivalent and a pneumatic spring associated with each wheel, each said spring being connected to a corresponding air chamber, deflections thereof being marked by air transfer between the spring and the chamber, a regulating system for said springs comprising: a source of air pressure carried by the vehicle, an air passage between said source and each individual spring, an electrically actuable valve in each said passage, means responsive to vehicle motion for maintaining said valves in closed position, an electrically actuable, normally open valve in the connection between each said spring and its corresponding air chamber, means associated with each spring sensitive to changes in the height of the sprung portion of the vehicle, said last means being operably connected to said first-mentioned valves, means controlled by said height-sensing means for exhausting air from said springs, means in electric circuit with said second-mentioned electrically actuable valve means for closing the same on the development of a displacement of the sprung portion of the vehicle due to an inertia condition, and timing apparatus governed by the inertia responsive means and in electric circuit with said first-mentioned electrically actuable valves operable to overrule said means responsive to vehicle motion whereby such valves are openable for a predetermined period on cessation of the inertia disturbance to permit air flow through said passages, when called for by said height-sensing means.

3. In an automotive vehicle having a plurality of road wheels or the equivalent and a pneumatic spring associated with each wheel, each said spring being connected to a corresponding air chamber, deflections thereof being marked by air transfer between the spring and the chamber, a regulating system for said springs comprising: a high pressure air tank carried by the vehicle, a compressor mounted on the vehicle and discharging to said high pressure tank, a low pressure tank from which said compressor draws, a passage for each spring connected to the high pressure tank, a passage for each spring connected to the low pressure tank, means connecting each said passage to the respective spring, a valve in each said passage, means responsive to vehicle motion for maintaining said valves in closed position, means sensitive to changes in the height of the sprung portion of the vehicle associated with each spring and operably connected to the corresponding valves, said means tending to maintain such portion of the vehicle at a predetermined level, a normally open valve in the connection between each said spring and its corresponding air chamber, inertia-sensitive means operably connected to said last valves for closing the same, with the vehicle in motion, when the sprung portion of the vehicle tends to become displaced due to an inertia condition said inertia-sensitive means is adapted to sense, timing apparatus governed by said inertia-sensitive means, and means controlled by said timing apparatus operably connected to said first recited valves operable to overrule said means responsive to vehicle motion whereby with the vehicle in motion such valves are opened for a predetermined period on cessation of the inertia disturbance to permit air flow through the corresponding passages, when called for by said height-sensing means.

4. In an automotive vehicle having a plurality of road wheels or the equivalent and a pneumatic spring associated with each wheel, each said spring being connected to a corresponding air chamber, deflections thereof being marked by air transfer between the spring and the chamber, a regulating system for said springs comprising: a high pressure air tank carried by the vehicle, a compressor mounted on the vehicle and discharging to said high pressure tank, a low pressure tank from which said compressor draws, a passage for each spring connected to the high pressure tank, a passage for each spring connected to the low pressure tank, means connecting each said passage to the respective spring, an electrically actuable valve in each said passage, means responsive to vehicle motion for disabling said valves, switch means responsive to changes in the height of the sprung portion of the vehicle associated with each spring and electrically connected to the corresponding valves, said switch means tending to maintain such portion of the vehicle at a predetermined level, an electrically actuable, normally open valve in the connection between each said spring and its corresponding air chamber, inertia-sensitive switch means in circuit with said last valves to close the same when, with the vehicle in motion, the sprung portion thereof tends to become displaced due to an inertia condition to which said inertia-sensitive switch means is responsive, and a hot wire time delay device governed through relay means by said inertia-sensitive switch means and electrically connected to said first recited valves in a manner overruling said means responsive to vehicle motion whereby such valves are openable for a predetermined period on cessation of the inertia disturbance to permit air flow through the corresponding passages, when called for by said height-sensing switches.

5. In an automotive suspension system incorporating air springs and levelling means controlling normally closed valves located in passages through which air may be supplied to and discharged from the springs, said levelling means including height-sensing switches, said valves being electrically actuable and in circuit with said switches, the combination with switch means in circuit with said valves adapted to sense inertia-induced displacements of the vehicle body, of electric time delay means governed through relay means by said inertia-sensitive switch means whereby on the cessation of an inertia disturbance sensible by said last switch means said valves are openable for a predetermined period if called for by said height-sensing switches.

6. In an automotive suspension system incorporating air springs and levelling means controlling valves in passages through which air may be supplied to and discharged from the springs, said levelling means including height-sensing devices, the combination of means responsive to vehicle motion for preventing opening said valves, with means adapted to sense an inertia-induced displacement of the vehicle body, means adapted to sense another inertia-induced displacement of said body and means governed by said first-mentioned displacement-sensing means whereby on the cessation of the inertia disturbance causing the displacement sensible thereby said valves are openable for a predetermined period to permit air to flow through said passages if called for by said height-sensing devices, said second displacement-sensing means, however, being adapted to overrule said governed means so that said valves cannot be opened if the vehicle body is in the attitude sensible by said second displacement-sensing means.

7. In an automotive suspension system incorporating air springs and levelling means controlling normally closed valves located in passages through which air may be supplied to and discharged from the springs, said levelling means including height-sensing switches, said valves being electrically actuable and in circuit with said switches, the combination with switch means adapted to sense an inertia-induced lateral displacement of the vehicle body, of switch means adapted to sense an inertia-induced longitudinal displacement of said body, each of said switch means being in circuit with electric time delay means governed through relay means by said first-mentioned switch means whereby on the cessation of the inertia disturbance causing the lateral displacement said valves are openable for a predetermined period to permit air to flow through said passages if called for by said height sensing switches, said second-mentioned switch means, however, being circuited with said time delay means to overrule the same so that said valves cannot be opened if the vehicle is in a longitudinally displaced attitude.

References Cited in the file of this patent
UNITED STATES PATENTS

| | | |
|---|---|---|
| 2,115,072 | Hunt et al. | Apr. 26, 1938 |
| 2,115,159 | Dupuy et al. | Apr. 26, 1938 |
| 2,506,726 | Magrum | May 9, 1950 |
| 2,653,021 | Levy | Sept. 22, 1953 |
| 2,762,633 | Gouirand | Sept. 11, 1956 |